United States Patent
Paterro

(10) Patent No.: US 6,290,184 B1
(45) Date of Patent: *Sep. 18, 2001

(54) FLYING CRAFT WITH WATER AND AIR PROPULSION SOURCE

(76) Inventor: Von Friedrich C. Paterro, 23-B $23^{rd}$ Floor, Makati Tuscany 6751 Ayala Avenue, Makati City (PH), 1226

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 09/200,703

(22) Filed: Nov. 27, 1998

(51) Int. Cl.$^7$ .................................................. B64G 1/40
(52) U.S. Cl. .................... 244/172; 244/23 R; 244/73 R; 60/39.182; 60/644.1; 60/227; 376/318; 376/907
(58) Field of Search ................................. 244/23 R, 172, 244/73 R; 60/644.1, 227; 376/318, 319, 907

(56) References Cited

U.S. PATENT DOCUMENTS

| Re. 31,697 | * | 10/1984 | Gomberg et al. . |
| 3,151,596 | * | 10/1964 | McMurtrey . |
| 3,252,281 | * | 5/1966 | Everett et al. . |
| 3,303,650 | * | 2/1967 | Yonts . |
| 3,353,354 | * | 11/1967 | Friedman et al. . |
| 3,402,555 | * | 9/1968 | Piper . |
| 3,547,379 | * | 12/1970 | Kappus et al. . |
| 3,547,380 | * | 12/1970 | Kappus et al. . |
| 3,574,057 | * | 4/1971 | Rom . |
| 4,147,590 | * | 4/1979 | Szekely . |
| 5,873,239 | * | 2/1999 | Culver . |

OTHER PUBLICATIONS

"UFO Wreckage Washes Upon Oregon Beach", *Weekly World News*, 1997.
"Experts Confirm: 1997 Photo of UFOs Taken By Astronaut is Real", *Weekly World News*, 1998.
"U.S. Air Force Builds UFO", *Weekly World News*, Sep. 1996, p. 4.
"Undersea UFOs Prowling Earth's Oceans", *Weekly World News*, Oct. 1996, p. 3.
"Boeing Gets Bigger & Flies Higher", *Newsweek*, Aug. 1996, p. 49.
"New Metal Created", Source and date unknown.

* cited by examiner

*Primary Examiner*—Charles T. Jordan
*Assistant Examiner*—Tien Dinh
(74) *Attorney, Agent, or Firm*—Oliff & Berridge, P.L.C.

(57) ABSTRACT

A propulsion system for a flying craft uses an air and water fuel source to provide propulsion thrust. The system includes two steam generating units, one attached directly to a compact turbine and the other connected to a compressor. The compressor compresses the steam from the latter steam generator, including excess steam from the turbine generator, and pumps it to a super-heated steam compression chamber. At the same time, the turbine generator powers another compressor to take in air from the atmosphere and pumps it into a super chilled compression chamber. After both the compressed super-heated steam and the compressed super chilled air have attained required pressure, volume and temperature, both gases are fed into an expansion chamber under appropriate control. The expansion chamber operates as a rocket booster and is equipped with an exhaust system made up of a main nozzle and several auxiliary thrust vectoring nozzles. Reactionary forces within the expansion chamber, caused by expansion of the chilled steam, cause thrust and generated heat. The generated heat heats the chilled compressed air within the gas expansion chamber, causing expansion of the chilled air, providing further thrust. The exhaust system controls exiting of the expanding gases to control and vector the thrust. Preferably, the heat source for the system is one or more nuclear reactors.

24 Claims, 16 Drawing Sheets

FLYING CRAFT WITH WATER AND AIR PROPULSION SOURCE

BACKGROUND OF THE INVENTION

1. Field of Invention

The invention relates to a flying craft capable of swift flight through a fluid medium, such as air, water or space, and a propulsion system therefore that is energy efficient, using air and water as main propulsion energy.

2. Description of Related Art

Numerous aircraft and spacecraft utilize solid or gas fossil fuels in jet or rocket engines to provide thrust necessary for flight of the craft. However, these fuels are costly, in limited supply, and not environmentally friendly.

Steam generators are known to provide low-cost energy by providing a driving force for one or more steam turbines. In such a system, generated steam is recirculated through a condenser to return the steam to water. The steam turbines produce low-cost electric energy, particularly when nuclear reactors are used as a heat source.

There is a need for a more economical and environmentally friendly fuel source and propulsion system that can be used to provide thrust for future aircraft and spacecraft. There is also a need for such a propulsion system that uses an abundant replenishable fuel source that will not further pollute our environment.

SUMMARY OF THE INVENTION

Applicant has overcome the above long felt needs and desires by inventing a novel propulsion system and flying craft therefore that does not rely on fossil fuels.

The invention relates to a flying craft that is driven by an air and water propulsion system through use of two steam generating units, one attached directly to a compact turbine and the other connected to a compressor. The compressor compresses the steam from the latter steam generator, including excess steam from the turbine generator, and pumps it to a super-heated steam compression chamber. At the same time, the turbine generator powers another compressor to take in air from the atmosphere and pump it into a super chilled compression chamber. After both the compressed super-heated steam and the compressed super chilled air have attained required pressure, volume and temperature, both compressed gases are fed into an expansion chamber under appropriate control.

The expansion chamber operates as a rocket booster and is equipped with an exhaust system made up of tiny, high-speed jet nozzles at its tip. The expansion chamber is further augmented by a main thrust vectoring nozzle and four two-stage thrust vectoring take-off and landing flaps. Various other auxiliary thrust vectoring nozzles direct thrust during cruising. The reactionary forces within the expansion chamber, caused by the simultaneous expansion of the chilled steam and the heated air, produce increased pressure and increased gas speed within the expansion chamber. These gases escape from the exhaust of the expansion chamber and provide a vertical thrust to force the craft upwards. The main thrust vectoring nozzle, along with the four thrust vectoring flaps, regulates the escaping gases and controls the speed and attitude of the craft. In a preferred embodiment, the craft has a saucer-shaped fuselage.

A propulsion system according to the invention comprises a water holding system; an air intake system; a heat source connected to the water holding system to generate heated water; a first heat exchanger that receives the heated water, the heat exchanger producing steam for driving a steam turbine; a second heat exchanger that receives the heated water, the second heat exchanger producing additional steam; a first compressor driven by the steam turbine for compressing the additional steam into superheated compressed steam; a heated steam compression chamber of a predetermined volume connected to the first compressor for receiving and storing the superheated compressed steam; a second compressor driven by the steam turbine and connected with the air intake system for producing compressed air; a chilled air compression chamber of a predetermined volume connected to the second compressor, the chilled air compression chamber receiving and storing the compressed air; a chilling mechanism for chilling the chilled air chamber; a gas expansion chamber of a predetermined volume connected to both the heated steam compression chamber and the chilled air compression chamber; control mechanisms located between the heated steam compression chamber and the gas expansion chamber and between the chilled air compression chamber and the gas expansion chamber for controlling flow of the superheated steam and the chilled air into the gas expansion chamber; and an exhaust system for directing exiting gases from the gas expansion chamber, wherein the gas expansion chamber receives a predetermined proportion of the superheated compressed steam and the chilled compressed air, which when combined react by rapid expansion and result in the exiting gases providing thrust as the exiting gases are expelled from the gas expansion chamber through the exhaust system.

BRIEF DESCRIPTION OF THE DRAWINGS

The invention will be described with reference to the following drawings wherein.

DETAILED DESCRIPTION OF PREFERRED EMBODIMENTS

Figure 1:
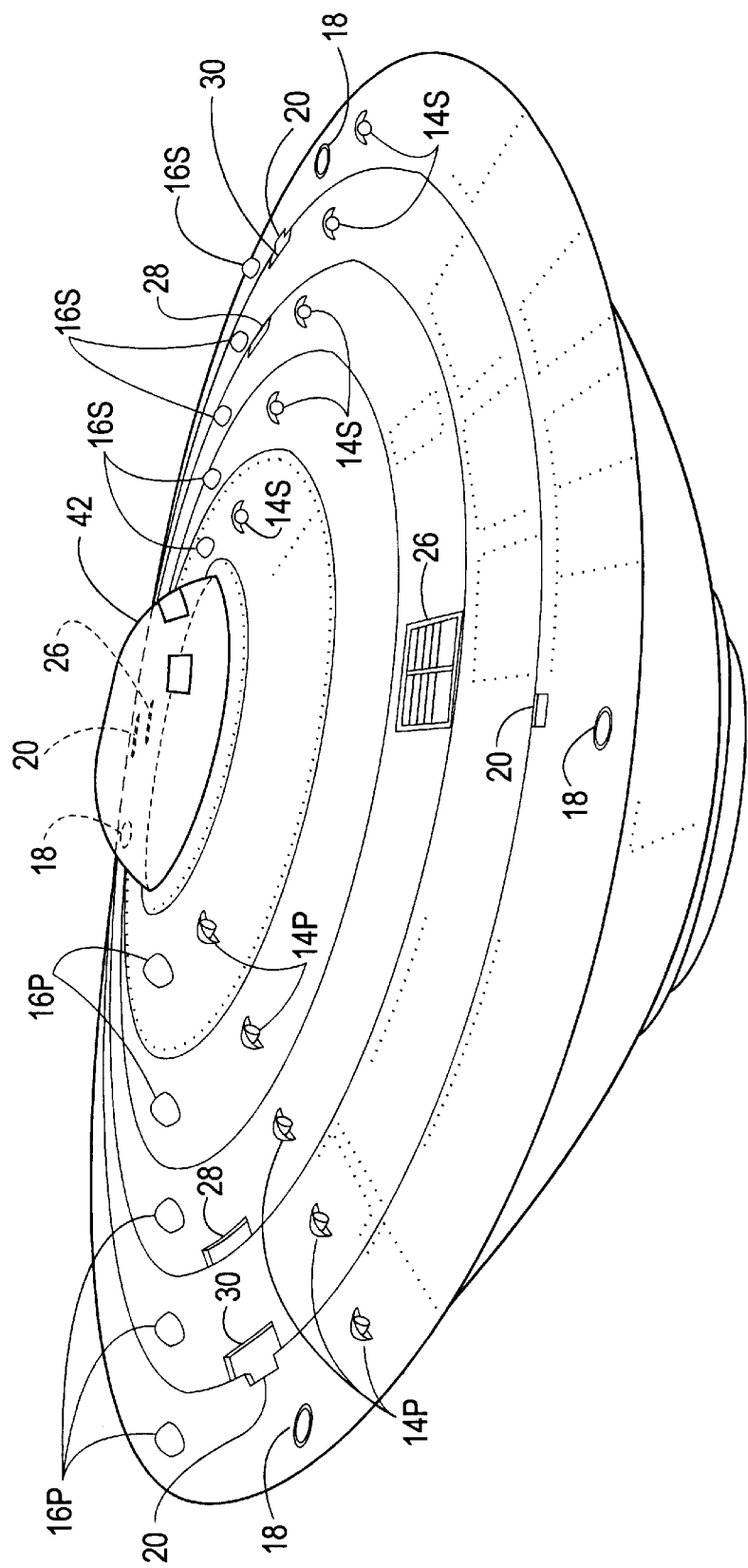
FIG. 1 illustrates a perspective view of an exemplary flying craft according to the invention.
Figure 2:
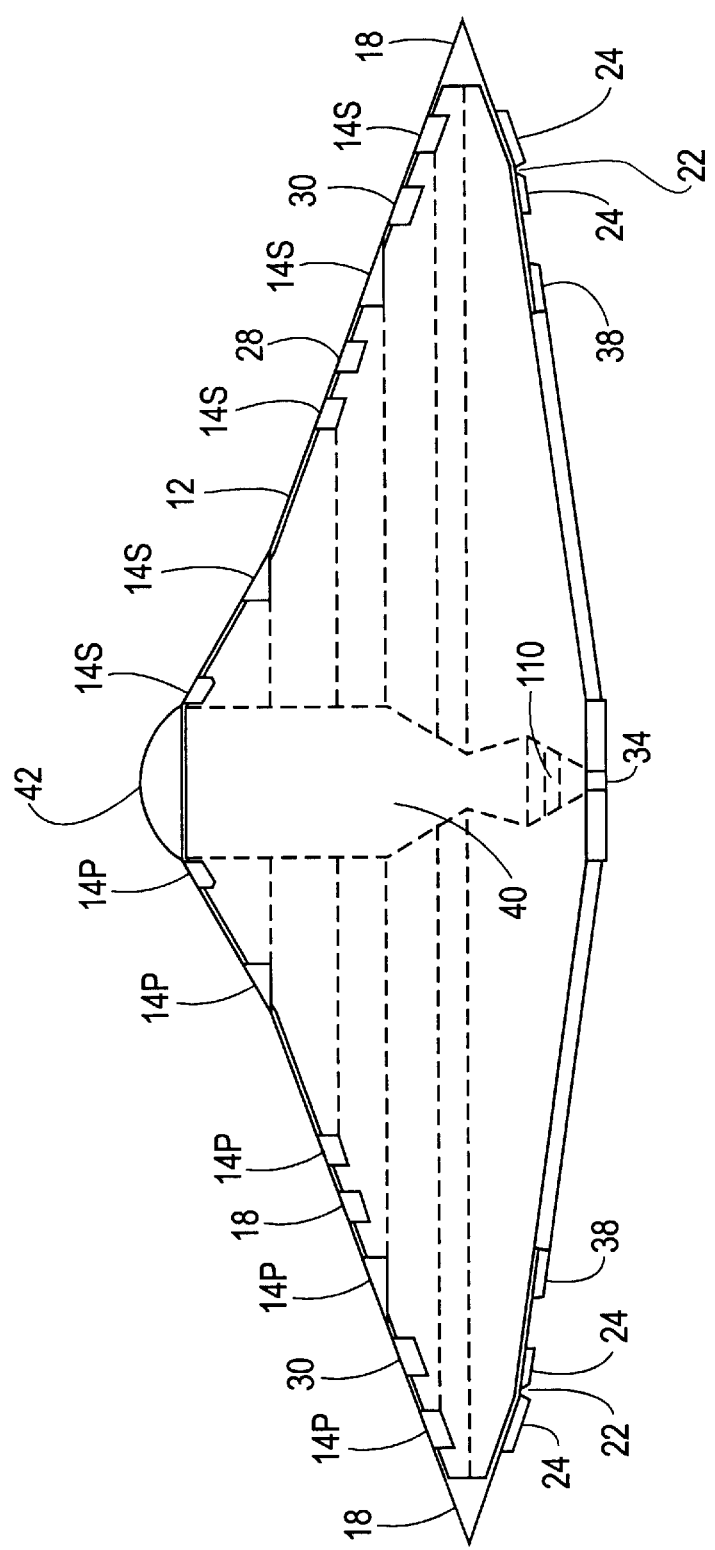
FIG. 2 illustrates a cross-sectional side view of the flying craft according to the invention.

With reference to FIGS. 1–4, an exemplary multi-purpose vertical take-off and landing (VTOL) flying craft 10 is shown having an exemplary saucer-shaped fuselage 12. Main thrust generation, used for both take-off and navigational mobility once in flight, is provided by thrust generated in gas expansion chamber 40 (see FIG. 2) and channeled and regulated through an exhaust system 110 and finally exiting from thrust vectoring nozzle 34 having a plurality of high speed jet nozzles 36.

Further flight navigational control is achieved through a series of thrust vectoring nozzles. In particular, forward flight navigation is provided by a series of auxiliary port-side and starboard-side forward thrust vectoring nozzles 14P and 14S. Likewise, backward navigation is provided by a series of backward thrust vectoring nozzles 16P and 16S. Downward thrust to lower the altitude of the flying craft is provided by downward thrust vectoring nozzles 18 while drift correction is handled by drift correcting thrust vectoring nozzles 20. Vertical thrust is augmented by vertical thrust vectoring nozzles 22. All of the auxiliary thrust vectoring nozzles use exhaust gases from the gas expansion chamber for thrust.

Once craft 10 achieves a desired altitude for horizontal flight, vertical thrust vectoring nozzle 34, along with the four vertical thrust vectoring nozzles 22, support the craft in a hovering configuration while the forward thrust vectoring nozzles 14P, 14S allow forward movement of the craft.

Various navigational and directional changes can be achieved through suitable control of the various auxiliary thrust vectoring nozzles. Thus, the craft can turn left or right, accelerate and decelerate, both vertically and horizontally in forward and backward directions, and rotate in any direction. Rudders 94 (FIGS. 8–9) can be raised and lowered to further achieve left or right rotation. Due to the various combinations of thrust vector nozzles, the flying craft is highly maneuverable, much more so than conventional winged aircraft.

Figure 3:
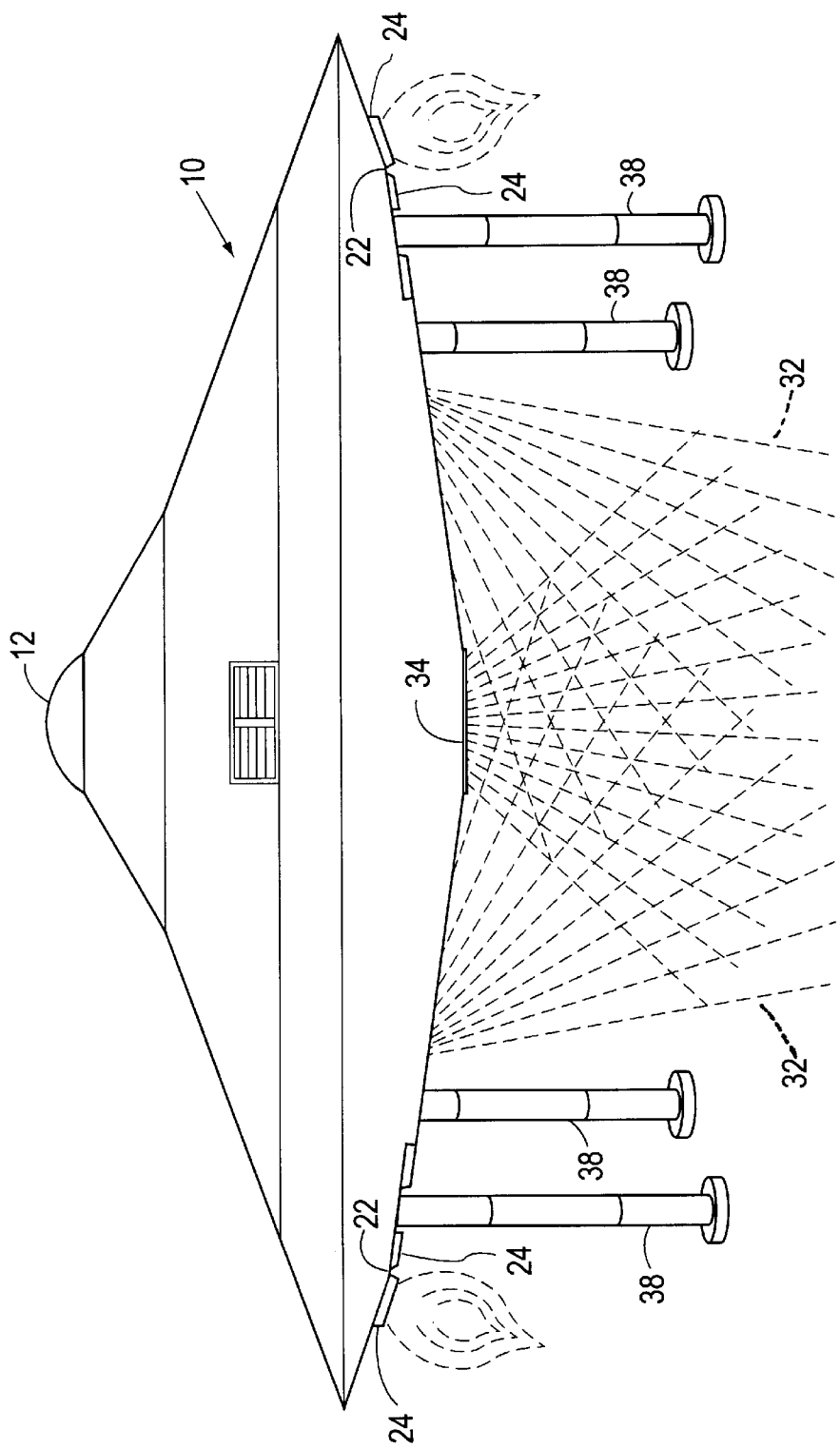
FIG. 3 illustrates a side view of the flying craft showing a landing configuration.
Figure 4:
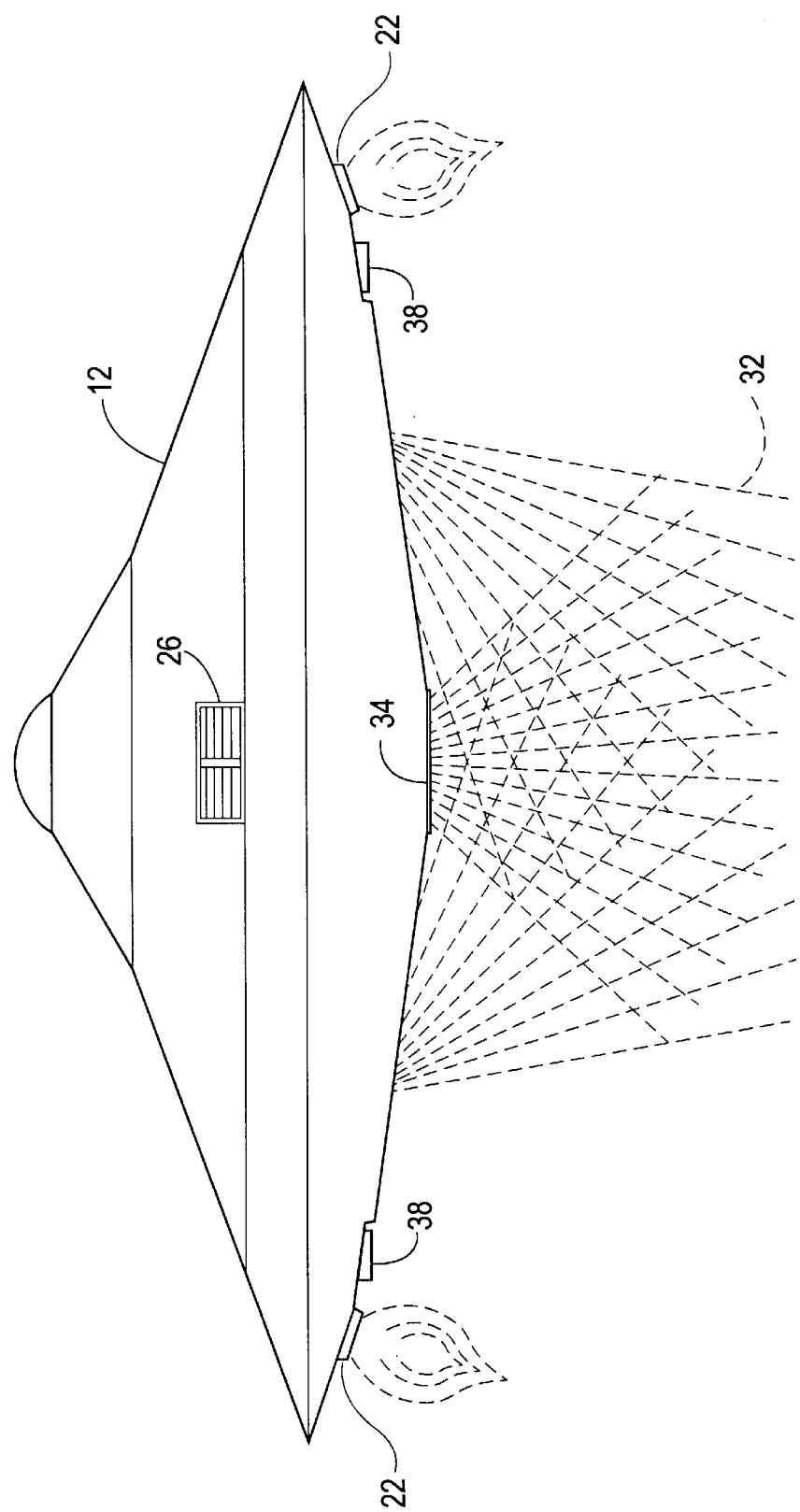
FIG. 4 illustrates yet another side view of the flying craft in a take-off position.

Telescopic landing gear 38 (four legs provided) can be raised or lowered between landing and flight positions as shown in FIGS. 3 and 4. As best illustrated in FIG. 1, the fuselage 12 is provided with a pressurized lock (door) 26 that can be raised or lowered to allow passage of personnel or cargo into and out of the craft. The fuselage 12 is also provided with decompression chambers. 28 and water intake valves 30, which will be described in more detail below.

A cockpit 42 is suitably located within the craft, and includes a window or other means for outside viewing by personnel, particularly by the pilot. If sufficient room is available, the cockpit can be located at a top of the fuselage, as shown, as this location has optimal viewing capabilities.

Figure 5:
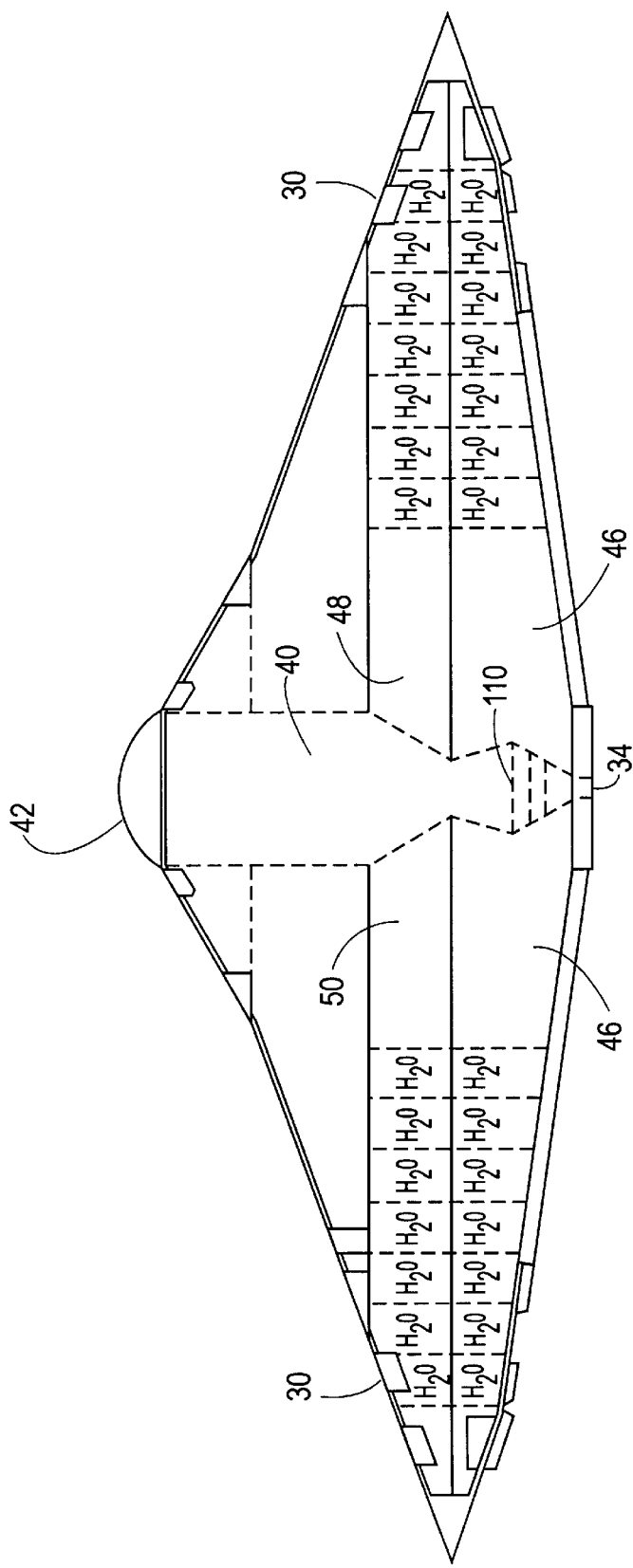
FIG. 5 illustrates a cross-sectional view of the flying craft showing various compartment locations.

FIG. 5 shows a cross-sectional view of the craft showing an exemplary compartment layout within fuselage 12. Gas expansion chamber 40 is centrally located while components making up the power source are located closely thereto, including atomic reactors 46, heated steam compression chamber 48 and chilled air compression chamber 50. Preferably, a water storage system includes a plurality of smaller compartments, equally provided throughout the remainder of the craft so that the craft is well balanced. Water is removed from these compartments in a manner that retains a balance of the weight. The various compartments making up the water storage system can be filled with water by water intake valves 30, which communicate with the various compartments and an external source of water. If desired, the craft can be made water-tight and capable of a water landing. In which case, the craft can submerge to a depth sufficient to allow refilling of the water storage system through water intake valves 30. Remaining space within fuselage 12 can store cargo or accommodate additional personnel. Additional viewing windows may be provided as necessary.

While particular navigational means have been provided, it is contemplated that other suitable navigational thrust generating and directing means could be substituted. Moreover, the inventive flying craft is not limited to a saucer-shape fuselage, but could have more conventional aircraft or spacecraft shape.

Figure 6:
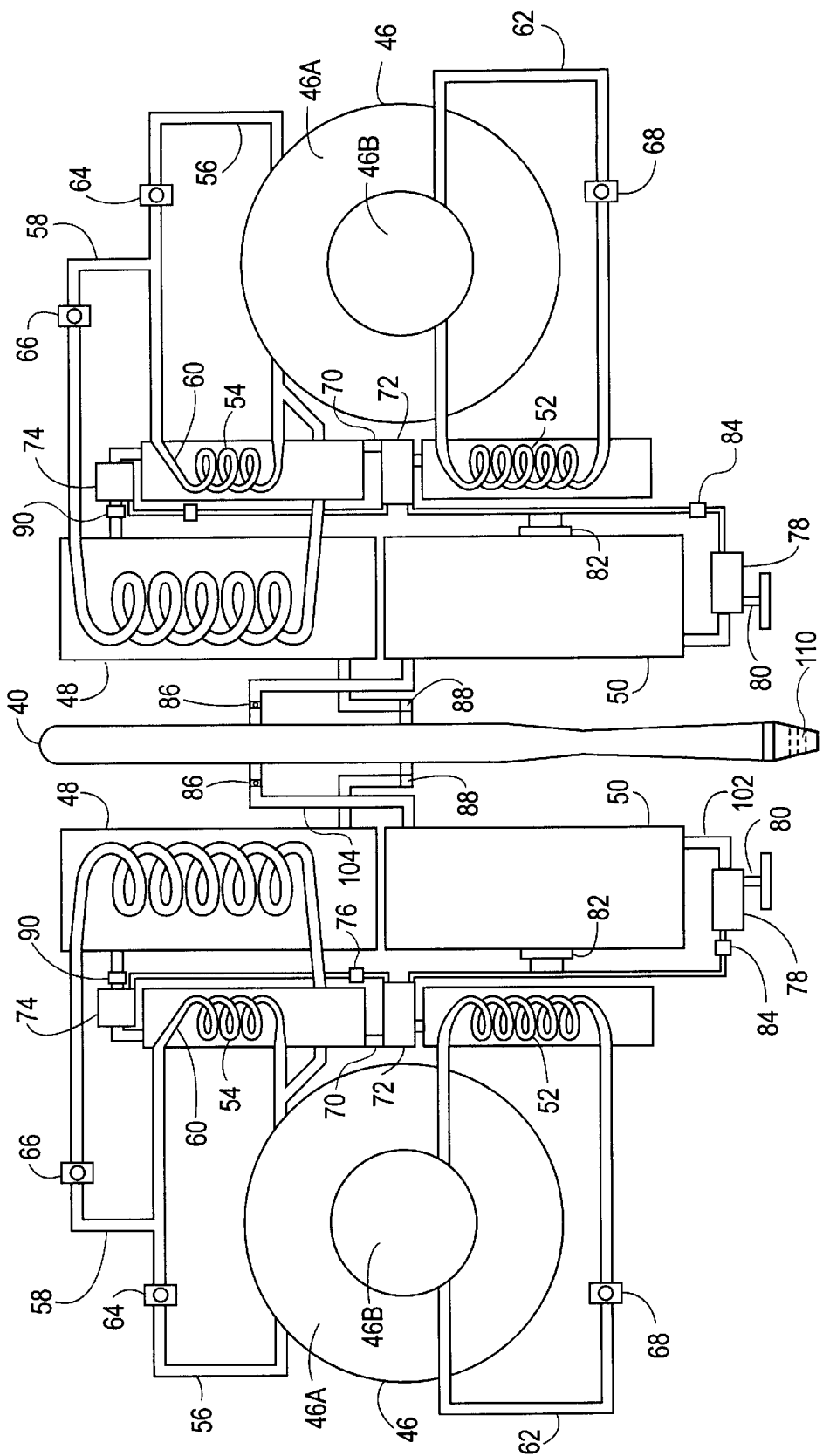
FIG. 6 illustrates an exemplary cross-sectional view of a power source according to the invention.

An exemplary propulsion source for the flying craft will now be described with reference to FIG. 6. Thrust for the craft 10 is provided by a fuel source of air and water through use of two symmetrical propulsion generating subsystems, disposed in opposition around gas expansion chamber 40. Like numbered parts function the same. Thus, only one subsystem will be described in detail.

Atomic reactor 46, preferably of the blanket and core type having blanket 46A and core 46B, is connected to heat exchangers 52,54 through service lines 56, 58, 60 and 62. The service lines include respective control valves 64, 66, 68 and 70. Heated steam from heat exchanger 52 is connected directly to a compact steam turbine generator 72. Excess steam is fed to heat exchanger 54 through control valve 70. Heat exchanger 54 is connected directly to a powerful compressor 74 powered by the steam turbine generator 72 through line 76. The compressor 74 sucks in the generated steam and pumps it into heated steam compression chamber 48 through line 90. The steam turbine generator 72 also powers a second air compressor 78, which sucks in air from the atmosphere through air intake system 80, which can consist of an air duct, and pumps it into chilled air compression chamber 50. Chamber 50 is chilled by chilling mechanism 82. Safety control 84 is provided between generator 72, chilling mechanism 82 and second air compressor 78.

Each of the heated steam compression chamber 48 and chilled air compression chamber 50 preferably stores eight times the volume of compressed gas compared to the volume of compressed gases within gas expansion chamber 40 at any given time. The total volume of compressed gases inside gas compression chambers 48, 50 (total of four chambers disposed around a central vertical axis) is thus preferably equal to thirty-two times that of the gas expansion chamber 40.

Figure 7:
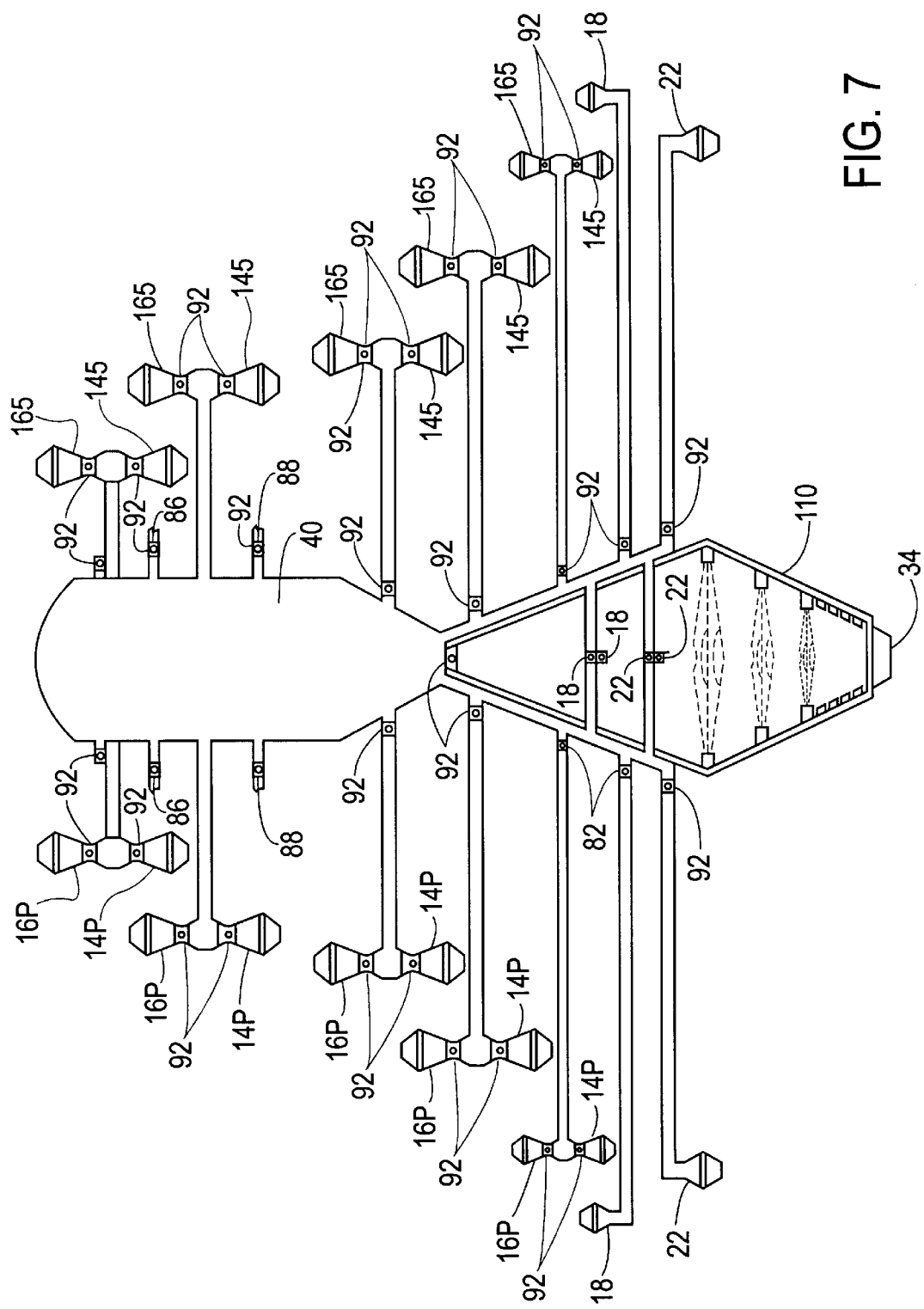
FIG. 7 illustrates a gas expansion chamber according to the invention.

Superheated steam from chamber 48 and chilled air from chamber 50 are proportionally released to gas expansion chamber 40 through service control lines 86, 88 in a controlled and balanced manner according to their pressure, volume and temperature. As best illustrated in FIG. 7, the superheated steam enters chamber 40 near the top. The chilled air enters gas expansion chamber 40 below where the superheated steam enters. Upon entering the gas expansion chamber 40, the compressed superheated steam begins to rapidly expand due to the reduced pressure in the gas expansion chamber 40 compared with that within chamber 48. This rapid expansion also results in generation of heat within gas expansion chamber 40 and downward propulsion of the expanding superheated steam towards the compressed chilled air and the thrust vectoring nozzle 34. The generated heat acts on the entering compressed chilled air, which accordingly also begins to rapidly expand as it is heated. This combination of reaction forces within gas expansion chamber 40 provide thrust for flying craft 10. A continuous source of thrust can be provided by controlled entrance of new gases into the chamber 40 from the chambers 48 and 50.

It is contemplated that an ideal proportion of super-heated steam to super-chilled air within gas expansion chamber 40 is 40:10. That is, 40 cubic feet of super-heated steam to 10 cubic feet of super-chilled air. After the super-heated gas and the super-chilled gas are both fed into gas expansion chamber 40, they begin to expand to about four times their previous volume due to a reduction in pressure. Both gases further expand as super-heated steam expands when chilled and super-chilled air expands when heated. When sufficient pressure exists, control valve 92 of the gas expansion chamber 40 is opened to allow exhausting of the gases and generation of thrust.

The laws defining the gases can be approximated by Boyle's first ideal gas law where P1V1=P2V2. Thus, if the pressure of a gas is doubled, the volume becomes one half. Under Charles' law, if a temperature of a gas is increased, the volume of the gas increases if the pressure remains the same. Or, if the volume is increased, the temperature of the gas increases if the pressure remains the same. Therefore, for a constant pressure, the temperature is directly proportional to the volume such that V1/V2=T1/T2.

If the volume of a gas remains the same and the temperature is increased, then the pressure increases. The reverse is also true. With constant volume, an increase in pressure produces an increase in temperature. Thus, P1/P2=T1/T2.

Gases are believed to be made up of molecules that are far apart from one another. Thus, gases are compressible. Gases expand when heated because heat gives the molecules the energy with which to move from one point to another. Hydrogen molecules at freezing (0° C.) are believed to be moving at about 1 mile per second. This speed increases as temperature increases. According to Avogrado, if the volume of any gas is 22.4 liters, the temperature is 0° C. and the pressure is 30" of Hg, the number of molecules present is $6 \times 10^{23}$ molecules.

Because air is a mixture of gases, it acts like a gas. If air is cooled, it shrinks. Thus, the motion of its molecules slow down. When compressed super-chilled air is heated, it expands immensely. Such expansion can be caused by the heating from superheated steam within the gas expansion chamber 40.

The present inventive propulsion system is similar to conventional jet engines where air is compressed and mixed with fossil fuel then burned in a combustion chamber to produce expanded gases that release energy to propel a craft. Similarly, rocket engines use liquid oxygen and solid rocket fuel to produce expanded gases. However, the inventive propulsion system does not rely on conventional fossil fuels.

FIG. 7 also illustrates various thrust vectoring nozzles of flying craft 10 and their interconnection with gas expansion chamber 40. In particular, gas expansion chamber 40 is provided with a shape similar to a rocket booster and fitted with a three-stage exhaust system 110 shrouded by thrust vectoring nozzle 34. Entry of super heated steam and chilled air into chamber 40 is regulated by control of service control lines 86, 88. The resultant reactionary force created within the gas expansion chamber 40 due to the rapid expansion of both gases passes through exhaust system 110 and thrust vectoring nozzle 34, which guide and regulate their escape. This generates main upward thrust capable of propelling the spacecraft 10.

Vertical thrust vectoring nozzle 34 can be controlled to provide hovering of the craft. This hovering or lift can be augmented by controlled release of escaping gases through the four thrust vectoring nozzles 22. Further steering and attitude control of the craft can be achieved by suitable control of forward thrust vectoring nozzles 14P, 14S, backward thrust vectoring nozzles 16P, 16S, downward thrust vectoring nozzles 18, and drift correction thrust vectoring nozzles 20, which can be activated individually or simultaneously to control various spacecraft movements. As shown, all of the thrust vectoring nozzles are connected to and receive escaping gases from gas expansion chamber 40 through selective opening of respective control valves 92.

Upon take-off, vertical thrust vectoring nozzles 22 maintain enough vertical thrust to maintain a desired hovering or elevated state. Landing gear 38 can then be retracted.

Figure 12:
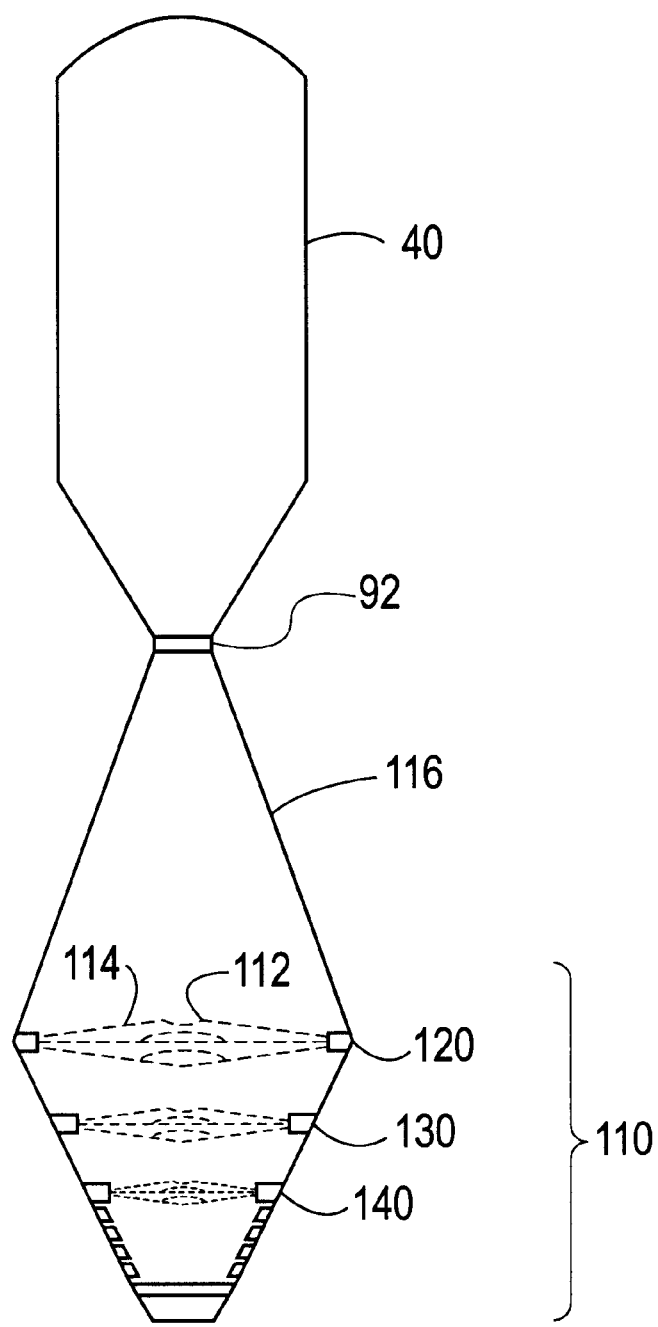
FIG. 12 illustrates a cross-sectional view of a disc-shaped exhaust system according to the invention.
Figure 13:
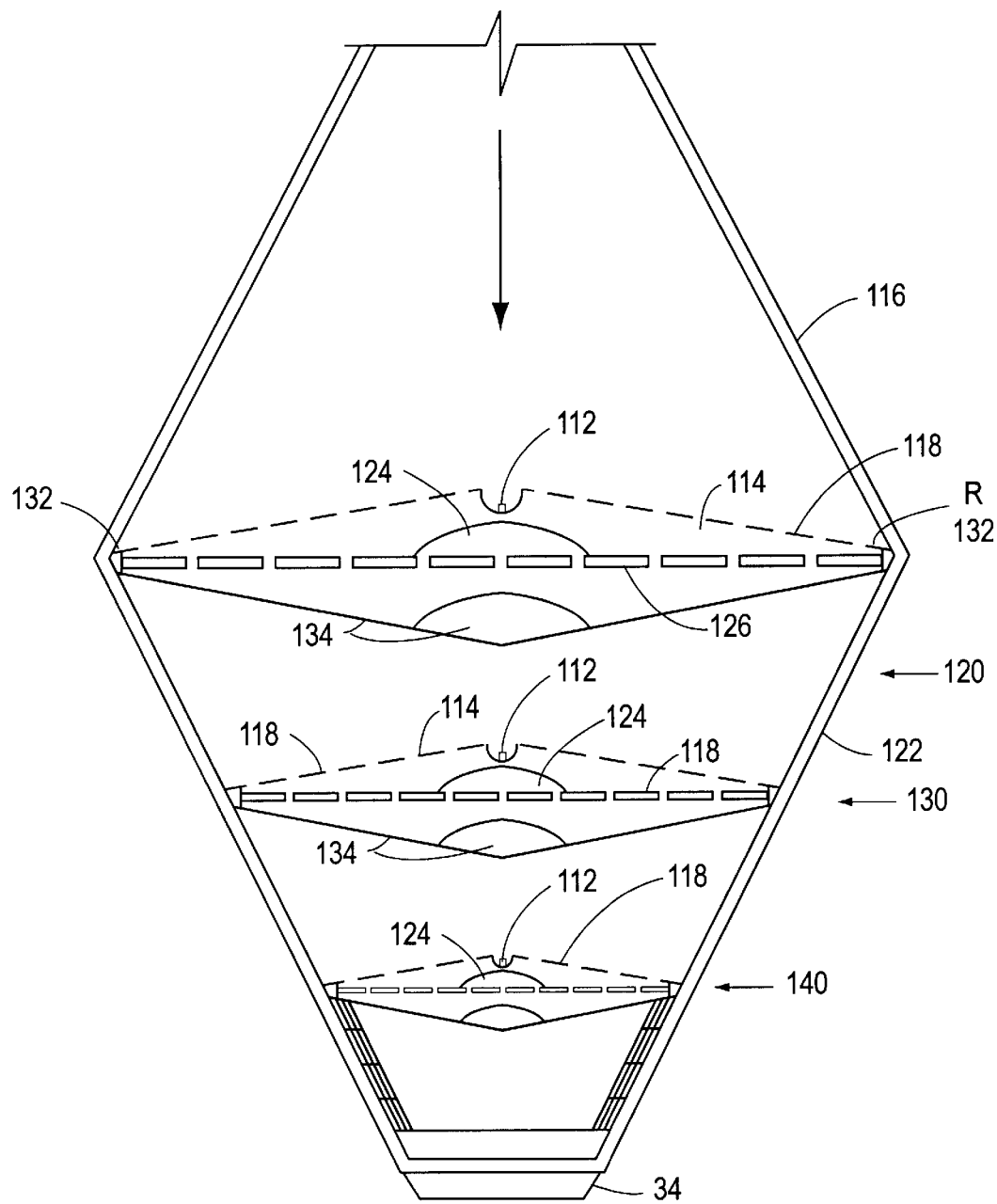
FIG. 13 illustrates a more detailed view of the exhaust system.
Figure 14:
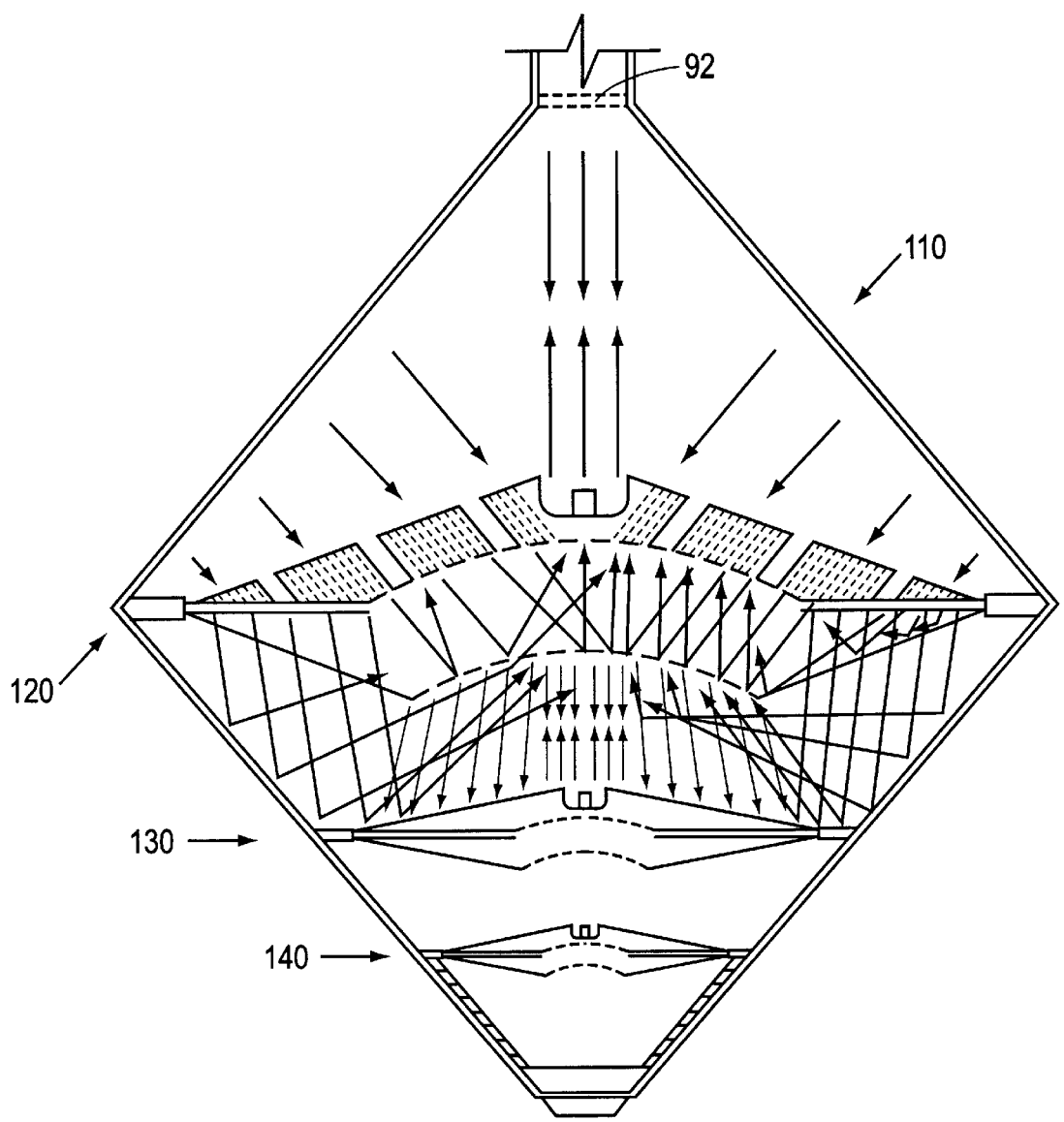
FIG. 14 is a cross-sectional view of the exhaust system showing exhaust flow through the system.
Figure 15:
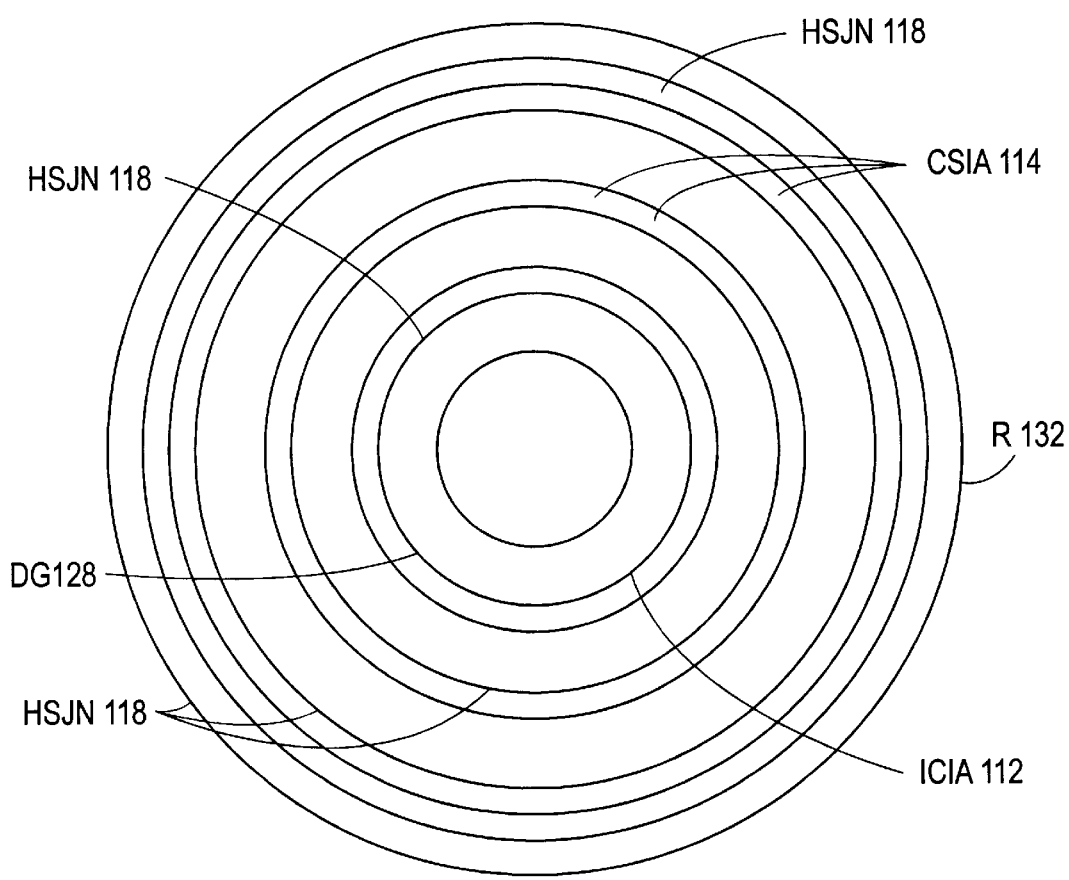
FIG. 15 is a top internal view of the exhaust system shown in FIGS. 13–14.

FIG. 12 illustrates the gas expansion chamber 40 in proportion to the preferred three-stage exhaust system 110. Exhaust system 110 comprises three stages: first stage 120, second stage 130 and third stage 140. Each stage includes a rim 132 that seals and spaces the stage from adjacent stages. More detailed views of the exhaust system are illustrated in FIGS. 13–15. Air duct control 92 of the gas expansion chamber 40 has a diameter that is equal to the diameter of an inverted cone impact area (ICIA) 112 of a first stage 120 of the exhaust system. Highly accelerated gases rushing down the ICIA 112 from air duct control 92 have a compounded tubular (solid) shape and upon impact with the ICIA 112 rise upward toward the height of the air duct control 92 where pressure is greater. This augments the original thrust of the system. Upon reaching air duct control 92, the rising gases are pushed down by the greater forces of the new gases coming from the main section of the gas expansion chamber 40 and then forced left to spin downward towards canalled solid impact area (CSIA) 114, which is deep and angled 45° towards the center, causing the spinning gases to continue spinning through all the CSIA 114. This creates a tornado effect as the gases rise once more within the circumferential area of a tapered conical top part 116 of the exhaust system 120. This creates an upward thrust while the bulk of the spinning accelerated gases are forced downward by the rush of new gases from air duct control 92 and exit at the angled high speed jet nozzles (HSJN) 118 toward a lower section 122 of the first stage 120 of exhaust system 110. Upon exiting high speed jet nozzles 118, the gases hit an upper cone-shaped reaction area (UCSRA) 124 causing further upward thrust due to the great pressure pushing the UCSRA 124 upwards. A lower cone-shaped reaction area (LCSRA) 134 is provided to serve as a push area for a lower stage.

When the volume of accelerated gases increase within the UCSRA 124, accelerated gases begin to move to a low pressure gas overflow channel 126 which is louvered and angled at 45° towards a second stage 130 of the exhaust system. When a large volume of accelerated gases pass through the louvered low pressure gas overflow channel 126, the pressure at the UCSRA 124 becomes greater producing additional thrust. Thus, the angled high speed jet nozzles 118 and angled gas overflow channel 126 contribute to thrust. This series of gas flow is repeated as the exiting gases travel through the smaller second stage 130 and smaller yet third stage 140 exhaust systems until the gases finally exit from the thrust vectoring nozzle 34.

Figure 8:
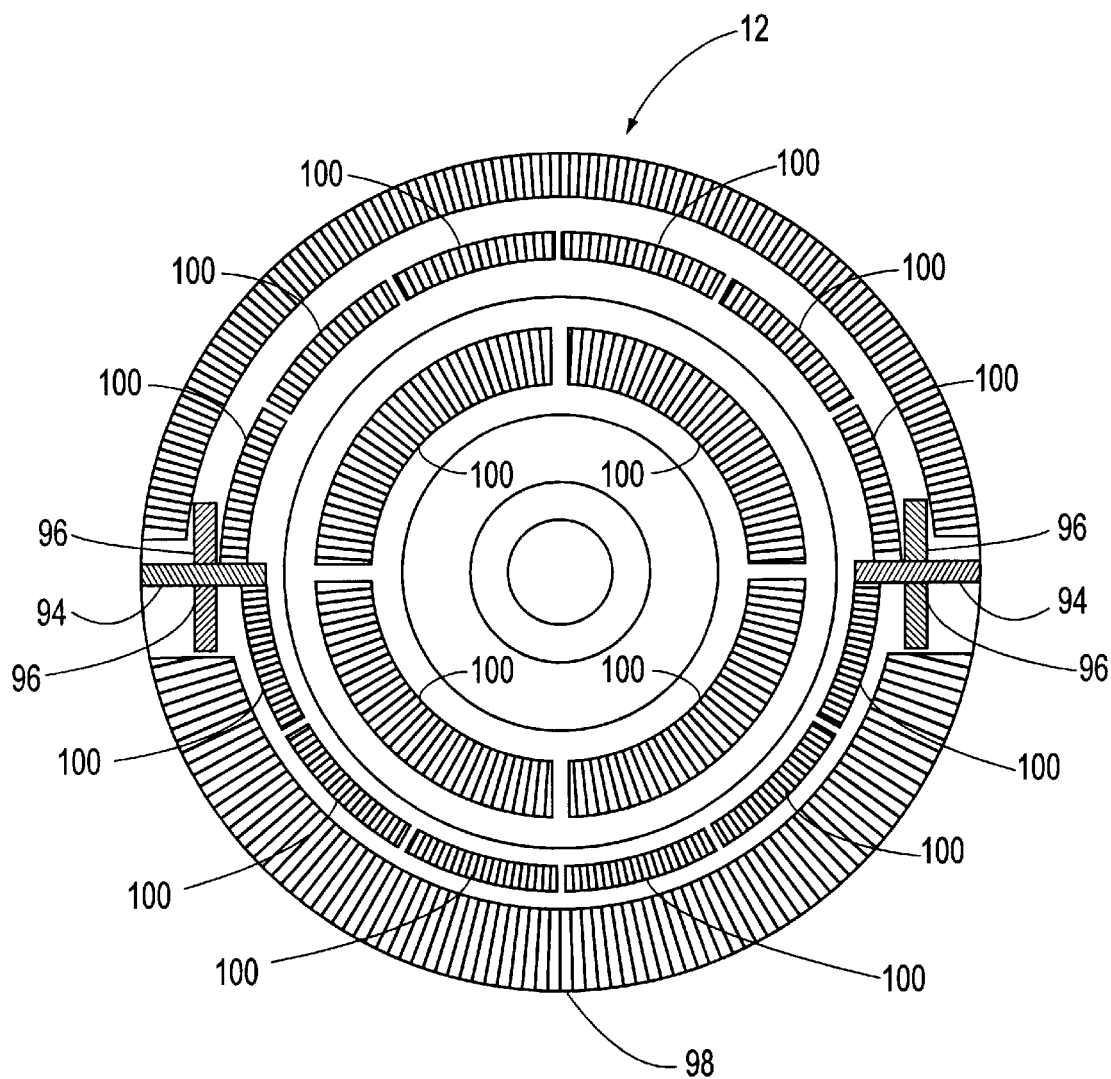
FIG. 8 illustrates a top view of the spaceship of FIG. 1.

FIG. 8 shows a top of fuselage 12 in which rudders 94 are provided for left and right steering movement. These rudders are retractable. To farther enhance flight capabilities, the saucer-shaped craft can be provided with retractable dual flight directional fins 96. Elevator 98 and flaperons 100 can also be provided as air brakes, stabilizers and flaps.

Figure 9:
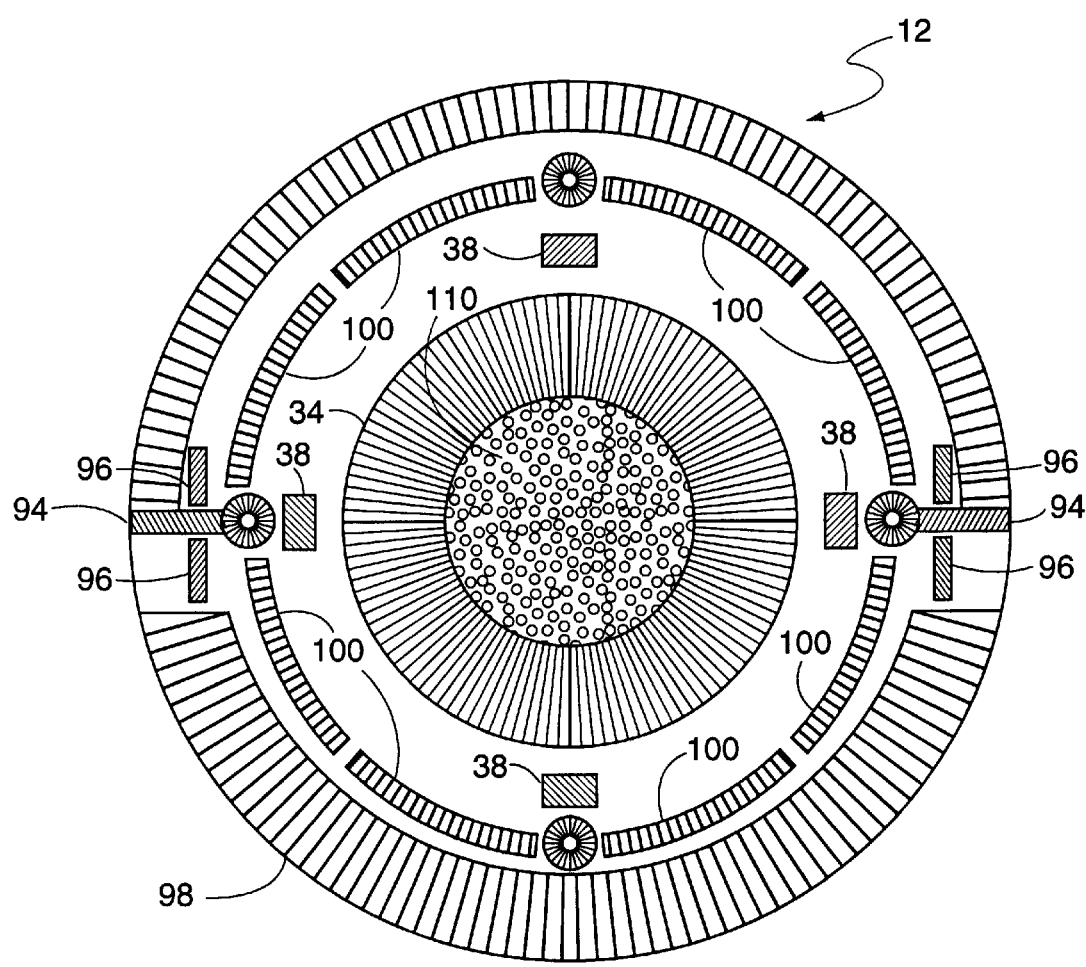
FIG. 9 illustrates a bottom view of the flying craft of FIG. 1.
Figure 10:
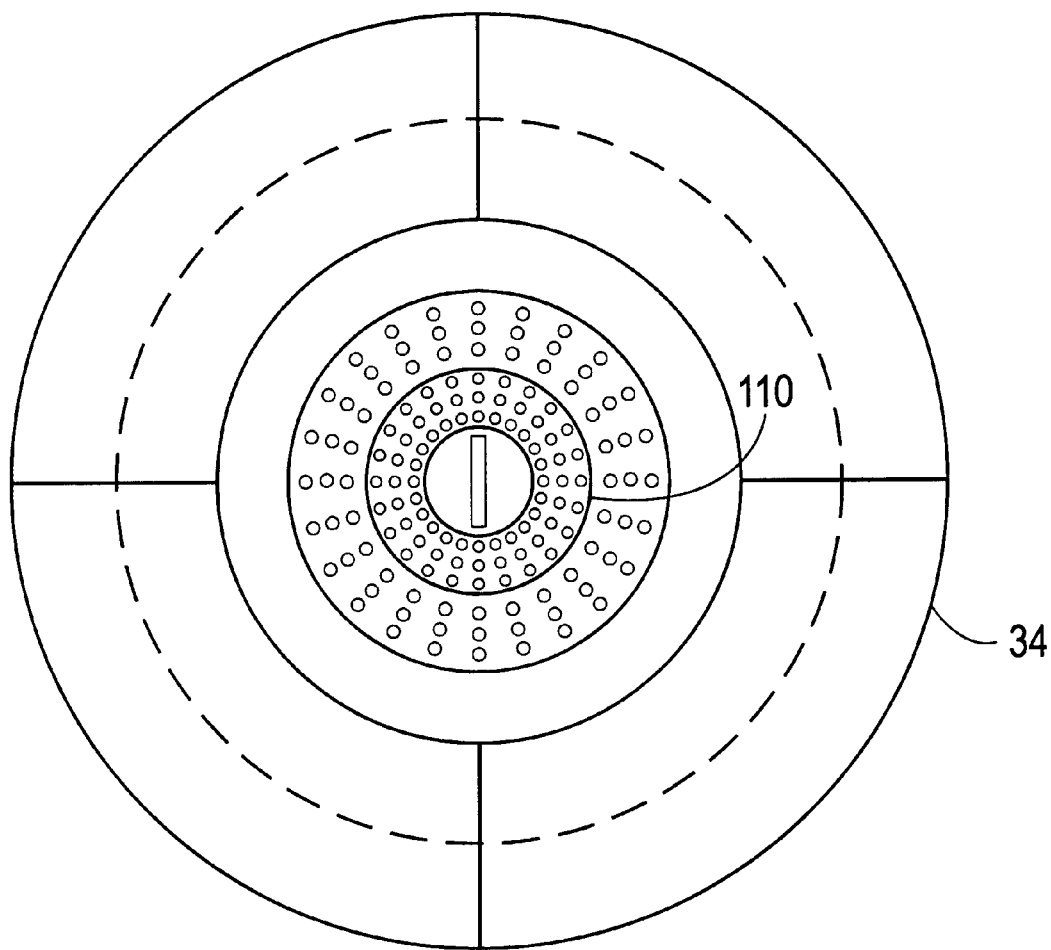
FIG. 10 illustrates a bottom partial view of the flying craft showing take-off thrust vectoring flaps and vertical thrust vectoring nozzles.
Figure 11:
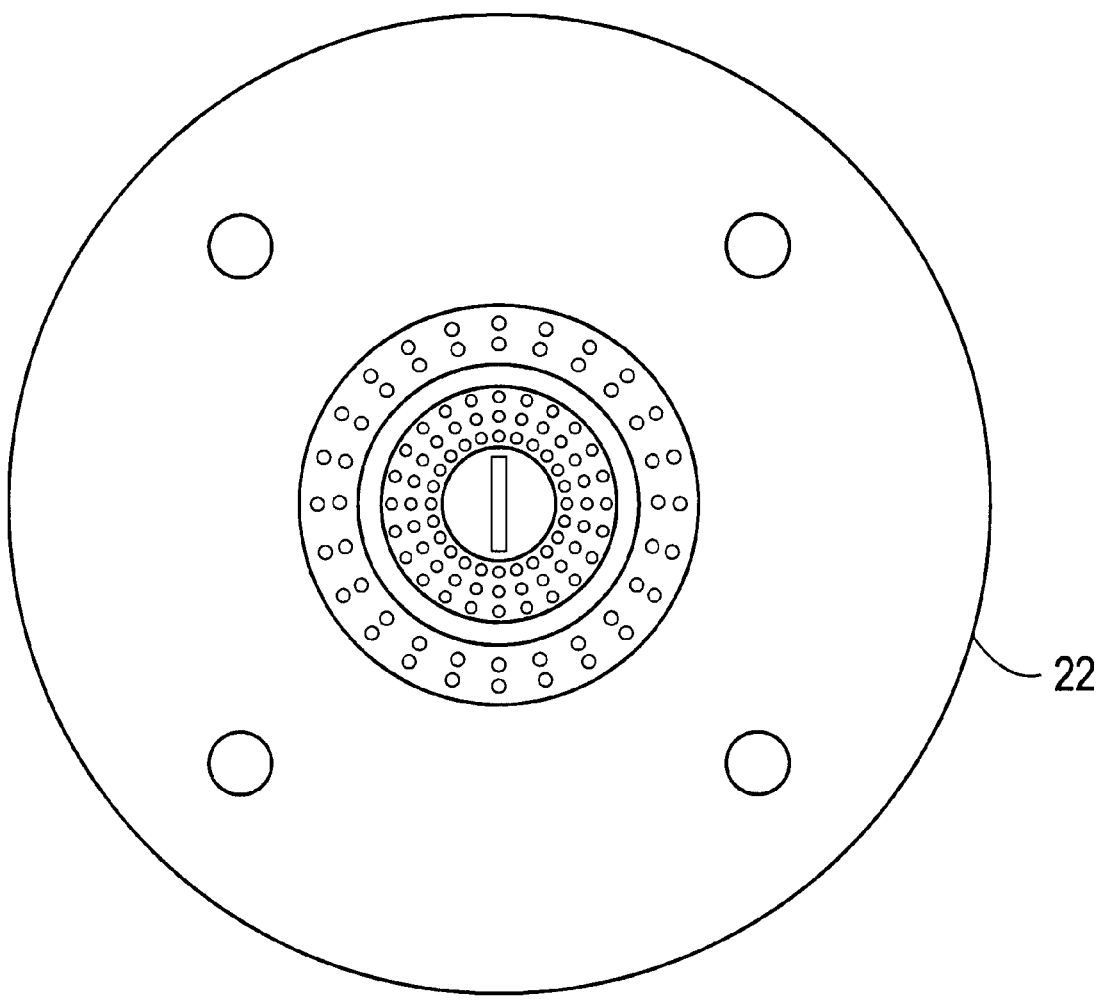
FIG. 11 illustrates a bottom partial view of individual vertical thrust vectoring nozzles according to the invention.

FIG. 9 shows a bottom of fuselage 12 showing various components, including rudders 94, directional fins 96, multipurpose flaperons 100, and vertical thrust vectoring nozzles 22. FIG. 10 shows a partial bottom view of the main thrust vectoring nozzle 34 and the bottom of three stage exhaust system 110. FIG. 11 shows a partial bottom view of one of the vertical thrust vectoring nozzles 22 with a similar three stage exhaust system. The other three vertical thrust vectoring nozzles 22 have substantially the same structure.

During landing operation, the landing gear 38 is lowered. To finely adjust landing attitude, drift correcting thrust vectoring nozzles 20 can be used. Upon landing, the telescoping landing gear 38 can be further lowered or raised to a desired spacecraft height.

In one embodiment, the craft is capable of underwater landing and operation. In such an embodiment, the craft is provided with water-tight seals and the air intake system is closed, either automatically or manually, when underwater. The fuselage is also designed to withstand anticipated pressures associated with a desired depth of operation. When moving through a fluid medium, such as water, the propulsion system can use remaining air stored within chilled air chamber 50. When this supply is exhausted, propulsion is achieved solely by the expansion of compressed superheated steam in gas expansion chamber 40.

In another embodiment, the flying craft can be used for interplanetary flight. The fuselage in such an embodiment would be designed to withstand the pressures and temperatures encountered when exiting or entering earth's atmosphere. Additionally, the fuselage would be pressurized. As in the previous embodiment, upon exhaustion of the air within chilled air chamber 50, propulsion would be achieved solely by the superheated steam. Depending on the size of the craft and the traveling range of the craft, more than two reactors 46 may be used. Obviously, a larger sized craft can have increased water capacity and thus a greater range. Optionally, when traveling through space, the exhaust gases can be vented back into the craft by a vacuum system powered by compressors so that the exhaust gases can be recycled.

Figure 16:
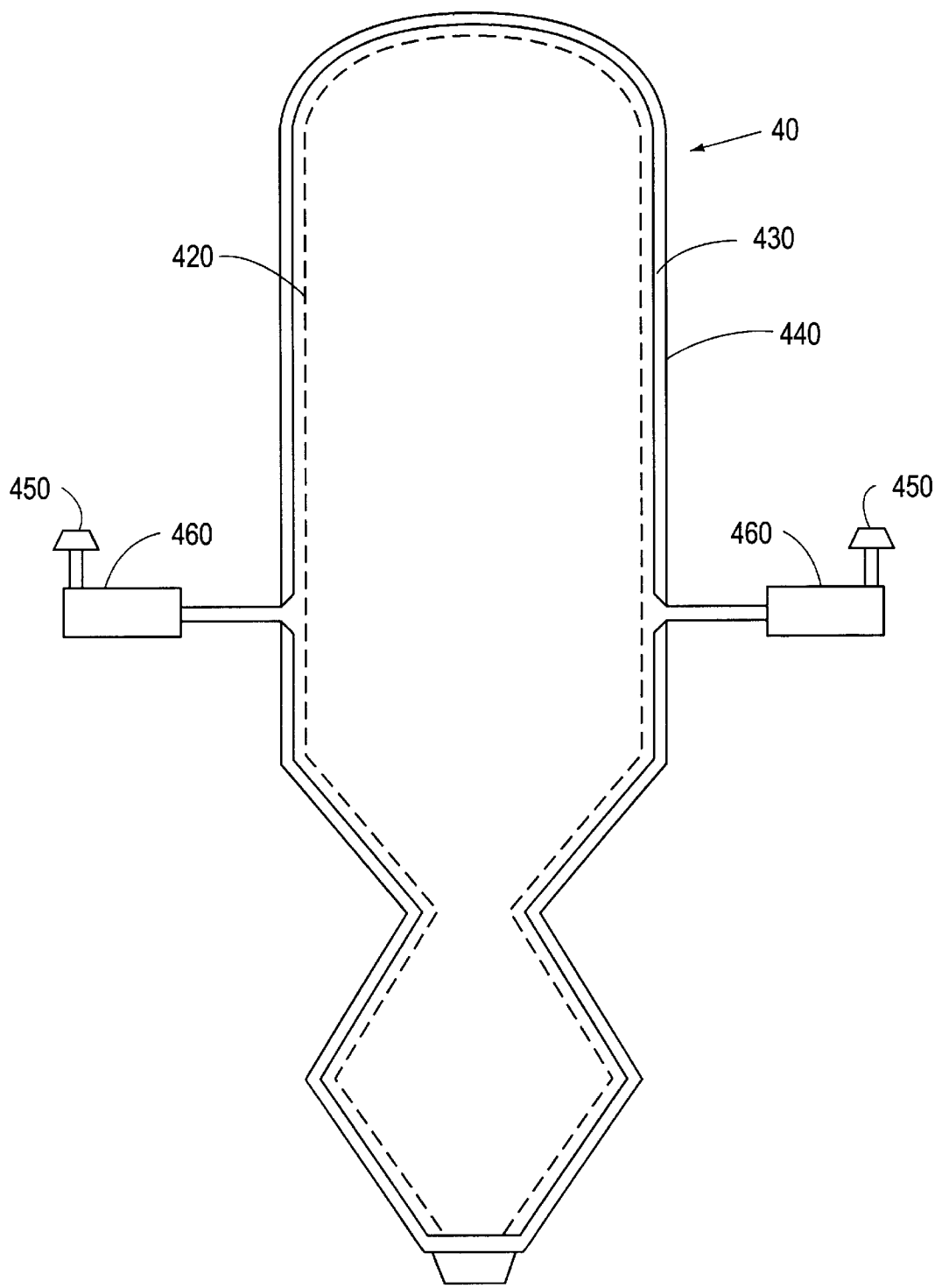
FIG. 16 is a cross-sectional view of the gas expansion chamber according to another embodiment of the invention.

In the embodiment shown in FIG. 16, for use during underwater or space travel, the gas expansion chamber 40 can include an inner wall 420, an outer wall 440, insulation 430 between the inner and outer walls, a chilling mechanism 460 to provide chilled air to cool the gas expansion chamber, and a generator 450 to generate power for the chilling mechanism 460. The insulation 430 maintains the desired chilling temperature of the gas expansion chamber 40.

In this embodiment, useful during underwater or space operation where air is in small supply, the gas expansion chamber 40 can be superchilled by way of chilling mechanism 460, which operates within the double-walled construction of the gas expansion chamber 40. This aids in expansion of the superheated steam inside the gas expansion chamber 40.

To handle the forces generated by the novel propulsion system, the gas expansion chamber should be made from a suitable high strength, high heat metal. Numerous suitable metals or composite materials would be known to one of ordinary skill in the art. One such suitable material is KM-1557. The remainder of the spacecraft can be made from suitable materials based on desired requirements for each component, based on its size, strength, weight, and intended use of the flying craft.

While specific aspects of the invention have been described with respect to preferred embodiments of the invention, these are not intended to be limiting. Various modifications can be made without departing from the scope of the appended claims.

What is claimed is:

1. A propulsion system for a flying craft using water and air, comprising:

a water holding system;

an air intake system;

a heat source connected to said water holding system to generate heated water from water within said water holding system;

a first heat exchanger that receives the heated water, said heat exchanger producing steam for driving a steam turbine;

a second heat exchanger that receives the heated water, said second heat exchanger producing additional steam;

a first compressor driven by said steam turbine for compressing the additional steam into superheated compressed steam;

a heated steam compression chamber of a predetermined volume connected to said first compressor for receiving and storing the superheated compressed steam;

a second compressor driven by said steam turbine and connected with said air intake system for producing compressed air;

a chilled air compression chamber of a predetermined volume connected to said second compressor, said chilled air compression chamber receiving and storing the compressed air;

a chilling mechanism for chilling said chilled air compression chamber;

a gas expansion chamber of a predetermined volume connected to both said heated steam compression chamber and said chilled air compression chamber;

control mechanisms located between said heated steam compression chamber and said gas expansion chamber and between said chilled air compression chamber and said gas expansion chamber that control flow of the superheated steam and the chilled air into said gas expansion chamber; and an exhaust system for directing exiting gases from said gas expansion chamber, wherein said gas expansion chamber receives a predetermined amount of the superheated compressed steam and the chilled compressed air, the superheated steam rapidly expanding within said gas expansion chamber and generating heat and flow of the compressed steam toward said exhaust system, the generated heat causing rapid expansion of the chilled compressed air, and the resultant expansion of the compressed steam and compressed chilled air providing thrust directed toward said exhaust system, said exhaust system directing the thrust to provide a desired propulsion force direction.

2. The propulsion system of claim 1, wherein said exhaust system includes a plurality of high-speed jet nozzles at an opening end of said gas expansion chamber.

3. The propulsion system of claim 1, wherein said exhaust system includes a main thrust vectoring nozzle for channeling and directed the exiting gases in a main vertical thrust direction.

4. The propulsion system of claim 3, further comprising at least one auxiliary thrust vectoring nozzle in communication with said gas expansion chamber for directing thrust in a direction other than the main thrust direction.

5. The propulsion system of claim 4, wherein said at least one auxiliary thrust vectoring nozzle includes one of a forward thrust vectoring nozzle, a backward thrust vectoring nozzle, and a downward thrust vectoring nozzle.

6. The propulsion system of claim 3, further comprising at least one auxiliary vertical thrust vectoring nozzle.

7. The propulsion system of claim 6, further comprising a plurality of movable vectoring flaps positionable into and out of a path of exiting gases from said at least one vertical thrust vectoring nozzle.

8. The propulsion system of claim 3, further comprising at least one drift correcting thrust vectoring nozzle.

9. The propulsion system of claim 1, wherein said heat source is an atomic reactor.

10. The propulsion system of claim 9, wherein said atomic reactor is of the core and blanket type.

11. A flying craft using a water and air fuel source comprising:
- a spacecraft fuselage;
- a water storage system within said fuselage;
- an air intake system;
- a heat source within said fuselage connected to said water storage system to generate heated water from water within said water storage system;
- a first heat exchanger within said fuselage that receives the heated water, said heat exchanger producing steam for driving a steam turbine;
- a second heat exchanger within said fuselage that receives the heated water, said second heat exchanger producing additional steam;
- a first compressor within said fuselage driven by said steam turbine for compressing the additional steam into superheated compressed steam;
- a heated steam compression chamber within said fuselage of a predetermined volume connected to said first compressor for receiving and storing the superheated compressed steam;
- a second compressor within said fuselage driven by said steam turbine and connected with said air intake system for producing compressed air;
- a chilled air compression chamber of a predetermined volume within said fuselage and connected to said second compressor, said chilled air compression chamber receiving and storing the compressed air;
- a chilling mechanism for chilling said chilled air chamber;
- a gas expansion chamber of a predetermined volume connected to both said heated steam compression chamber and said chilled air compression chamber;
- control mechanisms located between said heated steam compression chamber and said gas expansion chamber and between said chilled air compression chamber and said gas expansion chamber that control flow of the superheated steam and the chilled air into said gas expansion chamber; and
- an exhaust system for directing exiting gases from said gas expansion chamber, wherein said gas expansion chamber receives a predetermined amount of the superheated compressed steam and the chilled compressed air, the superheated steam rapidly expanding within said gas expansion chamber and generating heat and flow of the compressed steam toward said exhaust system, the generated heat causing rapid expansion of the chilled compressed air, and the resultant expansion of the compressed steam and compressed chilled air providing thrust directed toward said exhaust system, said exhaust system directing the thrust to provide a desired propulsion force direction.

12. The flying craft of claim 11, wherein said exhaust system includes a plurality of high-speed jet nozzles at an opening end of said gas expansion chamber.

13. The flying craft of claim 11, wherein said exhaust system includes a main thrust vectoring nozzle for channeling and directing the exiting gases in a main vertical thrust direction.

14. The flying craft of claim 13, further comprising at least one auxiliary thrust vectoring nozzle in communication with said gas expansion chamber for directing thrust in a direction other than the main thrust direction.

15. The flying craft of claim 14, wherein said at least one auxiliary thrust vectoring nozzle includes one of a forward thrust vectoring nozzle, a backward thrust vectoring nozzle, and a downward thrust vectoring nozzle.

16. The flying craft of claim 13, further comprising at least one auxiliary vertical thrust vectoring nozzle.

17. The flying craft of claim 16, further comprising a plurality of movable vectoring flaps positionable into and out of a path of exiting gases from said at least one vertical thrust vectoring nozzle.

18. The flying craft of claim 13, further comprising at least one drift correcting thrust vectoring nozzle.

19. The flying craft of claim 11, wherein said heat source is an atomic reactor.

20. The flying craft of claim 19, wherein said atomic reactor is of the core and blanket type.

21. The flying craft of claim 11, wherein said fuselage is saucer-shaped.

22. The flying craft of claim 21, further comprising a plurality of telescopic landing legs.

23. The flying craft of claim 21, further including at least one water intake valve communicating with said water holding system for filling said water holding system with water from a supply of water external from said flying craft.

24. A flying craft comprising:
- a spacecraft fuselage;
- a water storage system within said fuselage;
- a heat source within said fuselage connected to said water storage system to generate heated water from water within said water storage system;
- a first heat exchanger within said fuselage that receives the heated water, said heat exchanger producing steam for driving a steam turbine;
- a second heat exchanger within said fuselage that receives the heated water, said second heat exchanger producing additional steam;
- a first compressor within said fuselage driven by said steam turbine for compressing the additional steam into superheated compressed steam;
- a heated steam compression chamber within said fuselage of a predetermined volume connected to said first compressor for receiving and storing the superheated compressed steam;
- a gas expansion chamber of a predetermined volume connected to said heated steam compression chamber;
- a control mechanism located between said heated steam compression chamber and said gas expansion chamber that controls flow of the superheated steam into said gas expansion chamber; and
- an exhaust system for directing exiting gases from said gas expansion chamber, wherein said gas expansion chamber receives a predetermined amount of the superheated compressed steam, the superheated steam rapidly expanding within said gas expansion chamber and generating heat and flow of the compressed steam toward said exhaust system, the resultant expansion of the compressed steam providing thrust directed toward said exhaust system, said exhaust system directing the thrust to provide a desired propulsion force direction.

* * * * *